United States Patent
Walker et al.

[11] Patent Number: 6,009,696
[45] Date of Patent: Jan. 4, 2000

[54] HARVESTER HEAD FOR DRIED-ON-THE-VINE RAISINS

[76] Inventors: David L. Walker, 493 W. Caruthers Ave., Caruthers, Calif. 93609; Ray Austin, Jr., 1180 S. Valentine, Fresno, Calif. 93706

[21] Appl. No.: 08/940,434

[22] Filed: Sep. 30, 1997

[51] Int. Cl.[7] ............................. A01D 46/00; A01D 46/20
[52] U.S. Cl. .............................................. 56/328.1; 56/330
[58] Field of Search ............................. 56/327.1, 328.1, 56/330–331, DIG. 2; 460/142

[56] References Cited

U.S. PATENT DOCUMENTS

| | | | |
|---|---|---|---|
| 3,546,856 | 12/1970 | Hiyama | 56/1 |
| 3,892,061 | 7/1975 | Whitley | 56/27.5 |
| 4,063,406 | 12/1977 | Burton | 56/330 |
| 4,291,526 | 9/1981 | Hiyama et al. | 56/330 |
| 4,299,081 | 11/1981 | Harris et al. | 56/330 |
| 4,546,602 | 10/1985 | Cosimati | 56/327.1 |
| 5,067,314 | 11/1991 | Burke | 56/330 |
| 5,161,358 | 11/1992 | Crunkelton | 56/328.1 |
| 5,339,612 | 8/1994 | Scott | 56/330 |
| 5,355,667 | 10/1994 | Scott | 56/330 |
| 5,423,166 | 6/1995 | Scott | 56/330 |
| 5,557,883 | 9/1996 | Walker | 47/46 |

*Primary Examiner*—Robert E Pezzuto
*Attorney, Agent, or Firm*—Townsend & Townsend & Crew LLP

[57] ABSTRACT

A harvester (10) includes a harvester head (12) to harvest a crop from a crop plant. Harvester head (12) includes a series of rods (32) which orbit about associated shafts (52) when driven by a drive system (50). The crop, which will often comprise a vine or tree crop, and which will ideally comprise raisins (14), is detached from a plant such as vines (16) by translating harvester head (12) along the vines so that orbiting rods (32) comb laterally through the plant.

20 Claims, 3 Drawing Sheets

HARVESTER HEAD FOR DRIED-ON-THE-VINE RAISINS

BACKGROUND OF THE INVENTION

The present invention is generally related to devices, systems, and methods for harvesting crops from plants in the field, and in particular, provides a harvester head having a plurality of orbiting beater rods which can extend into and engage the plant to detach the crop, particularly for harvesting dried-on-the-vine raisins and other vine crops, olives and other tree crops, and the like.

Raisins sold in the United States have traditionally been dried in the sun after picking. The picked raisins are often placed on drying trays or strips of paper. These trays or paper strips are then placed on dirt mounded or terraced between the rows of vines. It usually takes about three weeks to sun dry raisins in the Central Valley of California, the leading raisin production region in the United States.

Although the traditional dried-on-the-ground methods for producing raisins are both simple and cost effective, this technique does have significant disadvantages. One particular disadvantage of dried-on-the-ground raisin production is the possibility of rain during the drying season. Rain which occurs during the three week drying period increases the susceptibility of the raisins to mold, infestation, and rot, and can potentially ruin the crop. Also, especially under more humid conditions, raisins may be attacked while on the ground by certain molds or mildew which can ruin them for human consumption. Another significant problem with dried-on-the-ground raisins is the cost associated with the separate production process steps: picking the grapes, placing the trays on the dirt mounds formed between the rows, and gathering the raisins after they have dried.

A variety of alternative methods for producing raisins have been proposed with varying degrees of success. Efforts have been made to mechanically harvest green grapes and automatically deposit them onto strips of drying paper between the rows. Unfortunately, because of the violence with which grapes are mechanically harvested, a certain amount of damage occurs to the grapes, leaving the grapes sticky. While this is not a problem if the grapes are immediately crushed (such as when making wine) leaving damaged grapes on trays on the ground may create lower raisin quality and could promote the growth of molds and mildew, as well as insect damage.

Still further grape production methods have been used. Raisins having a golden color may be produced by dipping the grapes in a caustic soda and water solution, exposing the dipped grapes to sulfur and carbon dioxide, and then drying the exposed grapes in a dehydrator. Alternatively, green grapes may be dipped in a hot water solution to split the skins and to promote drying. In Australia, green grapes are sprayed with an oil emulsion (typically 2% aqueous solution of methaloleate and potassium carbonate) to created tiny cracks in the skin which aid drying, as well as to produce a lighter color raisin.

An alternative Australian raisin production raisin system, sometimes called the Irymple Trellis System, dries the raisins on the vine prior to harvesting. In that system, the fruiting canes are supported on a horizontal trellis system along one side of the row, while replacement canes are supported along a reclined trellis system on the other side of the row. The fruit develops from the fruiting canes and hangs freely below a leaf canopy. When the fruit is mature, the grape bunches are sprayed with an oil emulsion, such as methaloleate, and the fruiting canes are cut to speed drying of the grapes. It has been found that limiting the number of cut canes to no more than about 50% of the total canopy avoids injuring the vine and reducing the next year's harvest. U.S. Pat. No. 5,557,883, the full disclosure of which is incorporated herein by reference, describes an improved trellis system and method which are particularly well suited for supporting grape vines to produce dried-on-the-vine raisins.

While dried-on-the-vine raisin production methods offer significant advantages over dried-on-the-ground methods, harvesting of the dried raisins remains somewhat problematic. In particular, detaching the lightweight dried raisins from the severed cane material can be difficult. These tough, elongate canes can play havoc on the harvesting and collecting equipment. In harvesting crops in general, and in harvesting dried-on-the-vine raisins in particular, it can be difficult to detach the crop from extraneous plant material without injuring the crop, the plant's future production capabilities, and any plant support structures (such as the trellis system).

In light of the above, it would be advantageous to provide improved devices, systems, and methods for harvesting dried-on-the-vine raisins and other crops. It would be particularly advantageous if these improved techniques were adapted to detach the crop from extraneous plant material as selectively and efficiently as possible. In other words, it would be preferable to include as much of the crop and as little extraneous plant materials as possible, while also harvesting the greatest amount of undamaged crop possible.

SUMMARY OF THE INVENTION

The present invention generally provides a harvesting head for use with a harvester in the field. The harvester head generally makes use of a series of orbiting beater rods. Each rod moves about a relatively small orbital path defining a limited harvesting range. The rods are preferably flexible, and extend in cantilever from a support frame. By combining a limited range of motion from several orbiting rods in a parallel arrangement, crops can be harvested with a very even harvesting action, and without drawing canes and other extraneous plant materials from the plants into the crop gathering mechanism of the harvester. The use of rods cantilevered which flex independently helps to minimize damage to the plant and plant support structure.

In a first aspect, the present invention provides a device for harvesting a crop from a crop plant. The device comprises a frame and a plurality of shafts which are rotatably mounted to the frame. Each shaft is rotatable about an associated axis, and a drive system is coupled to the shafts. A plurality of rods extend in cantilever from the shafts. Each rod defines an axis, and the axes of the rods are offset from the axes of the shafts. As a result, the rods orbit about the shafts when the shafts are rotated by the drive system.

In another aspect, the present invention provides a method for harvesting a crop from a crop plant. The method comprises rotating a plurality of shafts, wherein each shaft supports a rod which is offset from the shaft. As a result, the rods orbit about axes of the shafts. The shafts are moved so that ends of the rods extend into a crop plant. The crop is detached from the crop plant with the orbiting rods.

DESCRIPTION OF THE PREFERRED EMBODIMENT

The present invention provides improved devices, systems, and methods for harvesting crops from crop plants. These structures and techniques will find uses for a wide variety of crops, particularly for harvesting vine crops from rows of vines. Advantageous applications will also be found for harvesting of tree crops, particularly for the harvesting of olives. The most immediate application of the present invention, however, will be for harvesting dried-on-the-vine raisins from rows of grape plants.

Figure 1:
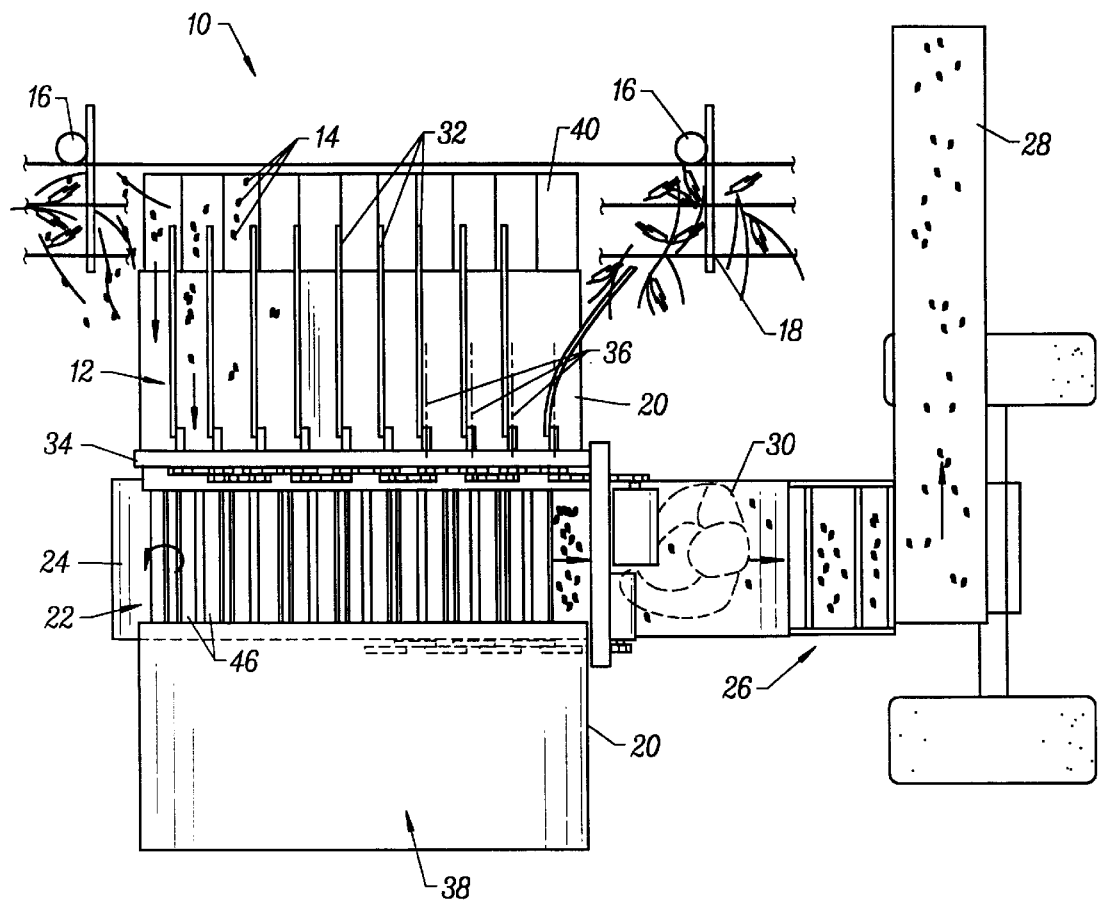
FIG. 1 is a top view of a harvester having a harvester head with a series of orbiting rods, and also illustrates a method for using such a harvester to harvest dried-on-the-vine raisins, according to the principles of the present invention.

Referring now to FIG. 1, a harvester 10 makes use of a harvester head 12 to detach dried-on-the-vine raisins 14 from grape vines 16. Vines 16 are supported by a trellis system 18, the trellis system ideally comprising a structure such as that described in U.S. Pat. No. 5,557,883, the full disclosure of which is incorporated herein by reference.

In addition to harvester head 12, harvester 10 generally includes a sloped tray 20 which directs the detached raisins 14 towards a cane separator 22. Cane separator 22 directs detached canes from vine 16 towards a forward end 24 of harvester 10, while raisins 14 fall through the cane separator to be gathered by a conveyor system 26. Conveyer system 26 transports the separated raisins rearward and upward, eventually directing the grapes laterally along a discharge conveyer 28 for collection in a truck or bin moving forward along with harvester 10 (not shown).

Typically, harvester 10 will be drawn forward between rows defined by trellis system 18 using a conventional tractor. The tractor will often provide hydraulic and/or electrical power to harvester 10 for driving harvester head 12, cane separator 22, conveyer system 26, and the like. Harvester 10 may include provisions for an operator 30 to monitor and/or direct the harvesting process. In alternative embodiments, the components of harvester 10 may be carried on the tractor, or may be provided on a specialized self-powered harvester, within the scope of the present invention.

As mentioned above, raisins 14 will generally drop onto sloped tray 20. Slope tray 20 directs raisins (and other detached material) toward cane separator 22. Sloped tray 20 will generally include a shaker plate 38 and articulated extenders 40. Articulated extenders 40 generally comprise a series of flexible overlapping plastic panels which extend individually from shaker plate 38. Extenders 40 can thereby flex upward and around vines 16 and trellis system 18 as harvester 10 moves forward.

Shaker plate 38 will generally be positioned below the height of raisins 14 hanging from vines 16. Shaker plate 38 and extenders 40 are sloped toward cane separator 22, and vibrate to help urge the raisins downward, as will be recognized by those of skill in the art. Shaker plates 38 may be oscillated by contact between the shaker plates and the rotating paddles of the cane separator, by a shaker mechanism coupled to the harvest head drive system, or by a dedicated oscillator mechanism.

Figure 2:
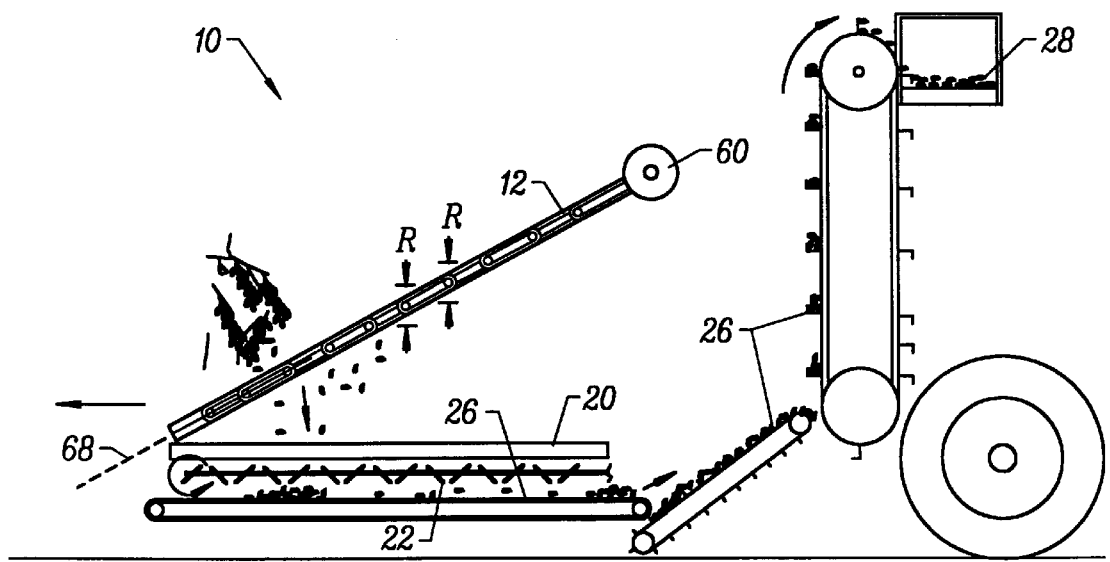
FIG. 2 is a simplified side view of the harvester of FIG. 1, showing how each orbiting rod harvests a limited height range, and how the rods are aligned so that the harvesting height ranges overlap as the harvester moves forward.
Figure 3:
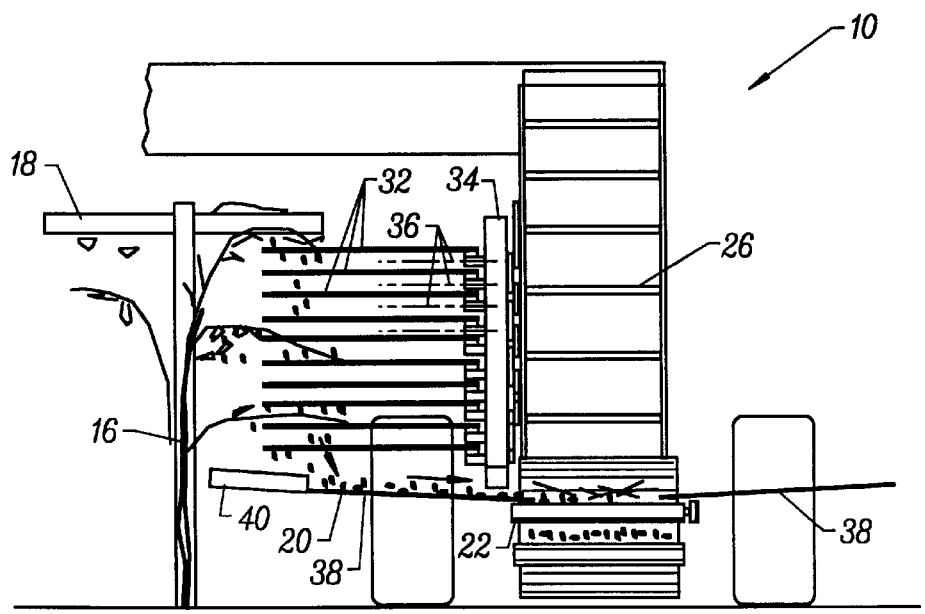
FIG. 3 is a front view of the harvester of FIG. 1, showing the orbiting rods extending into a raisin vine trellis system, illustrating how the parallel orbiting paths of the rods avoid drawing the vine material into the harvesting mechanism, and also showing how the harvested raisins are gathered.

In the embodiment illustrated in FIGS. 1–3, harvester head 12 extends laterally from the right side of harvester 10, while shaker plates 38 are provided on both sides of the harvester. Harvester heads will preferably be provided on both sides of the harvester to simultaneously harvest raisins from adjacent trellis systems, and the operator will ideally be able to turn the heads on the right and left side on and off independently. Alternatively, harvester head 12 may be adapted to move easily between the right and left sides of the harvester. This latter alternative facilitates re-configuring the harvester for harvesting from a single row along either the right or left side of a crop row. Still further alternatives are possible within the scope of the present invention, including disposing harvester head 12 so that beater rods 32 extend upward vertically to detach grapes from a horizontal overhead trellis canopy. In some embodiments, it may be possible to avoid a shaker mechanism by increasing the slope of sloped tray 20 toward cane separator 22. While harvester 10 is here shown with a single harvester head 12 having a single row of rods 32, it may be preferably to include a second harvester head above and parallel to the first head to provide a second row of rods. Such a second head might have substantially the same arrangement as a harvester head 12 and be disposed about 8.0 inches thereabove. The two heads may make use of separate drive systems, or may be coupled together to a single drive motor using drive chains or the like.

The use and operation of cane separator 22 is more fully described in our co-pending U.S. patent application Ser. No. 08/941,897 (Attorney Docket No. 10300-000400), entitled "CANE SEPARATOR FOR DRIED-ON-THE-VINE RAISIN HARVESTER," filed concurrently herewith, the full disclosure of which is incorporated herein by reference. Basically, cane separator 22 makes use of a series of paddles 46 which rotate in unison. By properly sizing and spacing paddles 46, and by rotating paddles 46 at the proper speeds, cane and other large extraneous vine materials will be intercepted as they drop onto paddles 46, and the upper portion of the rotating paddles will urge these unwanted byproducts forward and off of harvester 10. However, the small dense raisins 14 will fall substantially unimpeded through cane separator 22 between paddles 46, to be gathered and transported by conveyor system 26.

Figure 4:
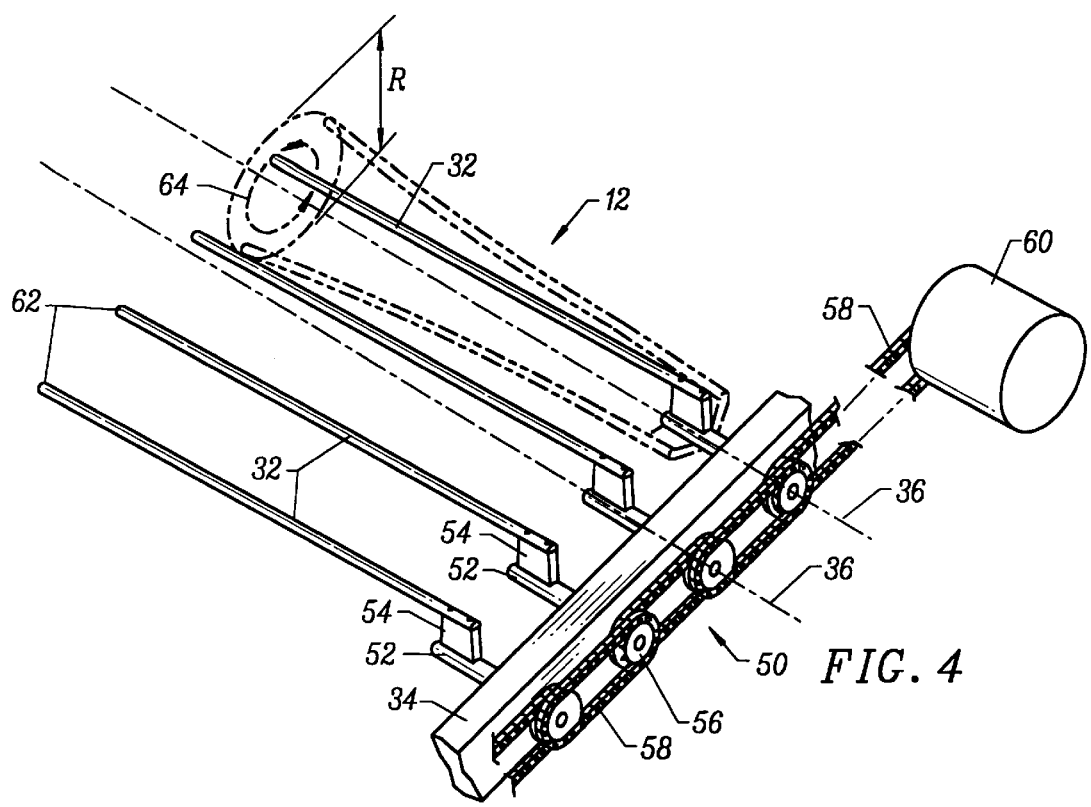
FIG. 4 is a perspective view showing the frame and drive system for the orbiting rods of the harvester of FIG. 1.
Figure 5:
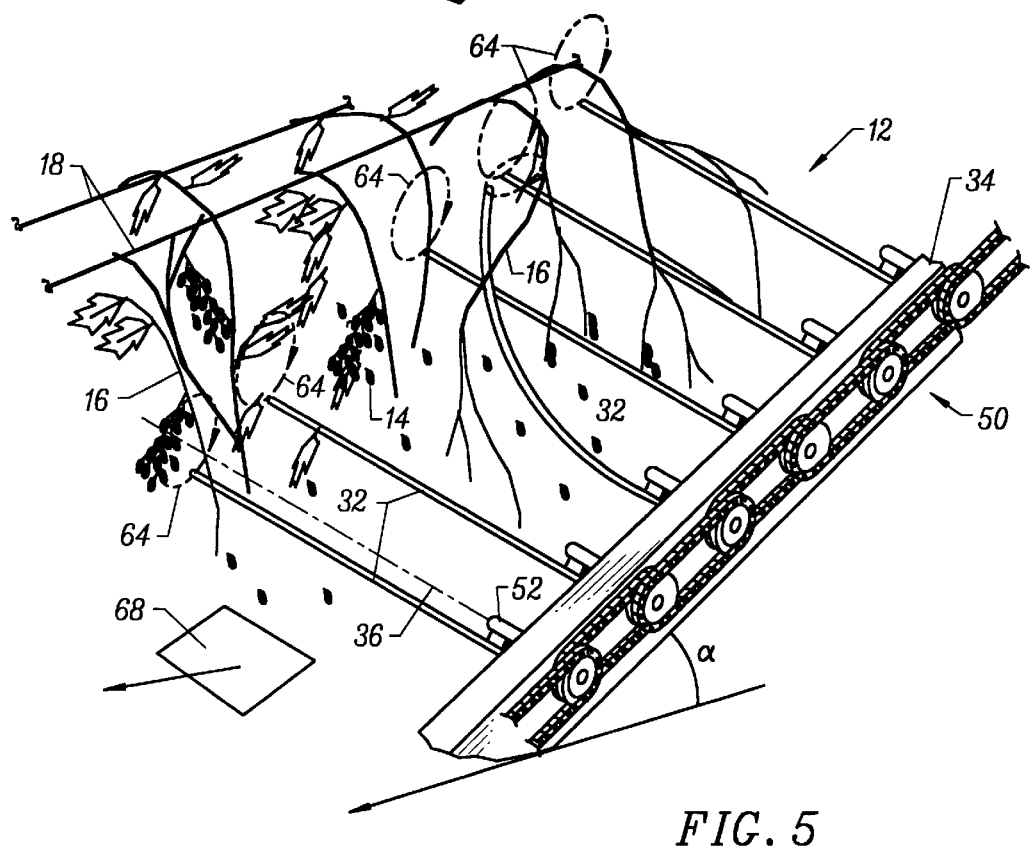
FIG. 5 is a perspective view illustrating how the flexibility of the rods prevents damage to the trellis and raisin plants.

The operation and structure of harvester head 12 can be understood with reference to FIGS. 4 and 5. Harvester head frame 34 supports beater rods 32 and a drive system 50, the frame typically comprising a length of metal angle, tube, or channel stock, the frame ideally comprising two pieces of 5.0 inch steel channel which are bolted and/or welded together. A series of axial shafts 52 are mounted to frame 34, with the shafts typically being supported by bearings (not shown) which are fastened to the frame structure.

Beater rods 32 are laterally offset from shafts 52 and are supported by brackets 54. Rods 32 will typically be fastened to brackets 54 using screws, bolts, or the like, and these fasteners may also be used to attach the brackets to axial shafts 52. A wide variety of alternative structures might be used to support rods 32 so that the axes of the rods are offset from the axes of the shafts, including integral rods and brackets, flanges which extend radially from the shafts, or bent shafts which extend continuously to form both the rod and shaft from a single material. Forming brackets 54 with a simple split clamp which removably receives rods 32 facilitates rod replacement. A rubber hose (or the like) may be disposed around the rods within such clamps to avoid stress concentrations and wear at the clamp edge.

As seen most clearly in FIG. 4, shafts 52 extend through frame 34 to sprockets 56. Drive chains 58 rotationally couple shafts 52 to a drive motor 60, and may also maintain angular alignment between the shafts along frame 34.

As drive motor 60 rotates shafts 52 through chains 58 and sprockets 56, rods 32 precess or orbit about axes 36 of the shafts. Where drive motor 60 rotates shafts 52 relatively slowly, so that the centrifugal forces on the shafts are relatively small, ends 62 of the rods follow a first small orbital path 64. Where motor 60 rotates shafts 52 at a higher rate, the centrifugal forces on rods 32 causes the rods to flex radially outwardly, thereby increasing the size of the orbital path, as can be understood with reference to FIG. 4.

It should be understood that while only a single orbital path is illustrated in FIG. 4 for clarity, each of rods 32 will be rotating in unison. As orbital path diameter increases with increasing rotational speed, an operator can adjust the range of movement of each rod, and specifically, an orbital height range R without otherwise individually adjusting the rods support structure. Variations in drive speed will also alter the intensity of the orbital harvesting action of the rods against the vines.

As can be understood from the above description, rods 34 will typically comprise an elongate flexible structure, often being formed of a polymer, or a composite such as fiberglass. In the exemplary embodiment, rods 34 comprise fiberglass having a diameter of 7/16 inches and a length of 3.0 feet. Depending on the crop to be harvested, and the specific design of the harvester and harvester head, rods 32 will typically have lengths between about 24.0 inches and 96.0 inches. Between about 6 and 26 rods will be provided on each harvester head.

Shafts 52 will comprise metallic axial structures typically including steel, aluminum, or the like, and brackets 54 may be formed of metallic, composite, or a polymer having sufficient strength to support the rods. Drive chains 58 comprise #50 roller chains of about 14.0 inches in length each, in the exemplary embodiment. The drive system may alternatively make use of a drive shaft having pairs of right angle bevel gears for each shaft 52, or may include drive belts or the like.

Harvester head 12 is here illustrated with brackets 54 and rods 32 which are each offset in the same direction from their associated shaft 52. In other words, in FIG. 4, each of the rods is illustrated as being above its associated shaft. It should be understood that drive system 50 will often instead maintain an offset angle between adjacent shafts, so that when a particular bracket supports its associated rod above the shaft, the adjacent brackets will support their rods forward of the shaft, rearward of the shaft, or the like. This will reduce vibration which might otherwise be induced by having the eccentric weight of the rods swinging in the same direction at the same time as they proceed along their orbital paths. By maintaining the shafts at different rotational positions, the total vibrational loads imposed on frame 34 of shafts 52 may be decreased.

Contact between orbiting rods 32 may also be decreased by selecting the proper offset angle between associated brackets. For example, adjacent brackets which are offset by 180° could result in rods 32 coming into contact as they flex directly towards each other. Brackets which are offset at an angle of about 90° instead result in one rod flexing upward or downward while the other rod is at the closest portion of its orbital path. Such offset angles are not required for operation of harvester head 12, as contact between adjacent orbiting rods may not damage the rods, the plant, or the drive system.

The engagement between harvester head 12 and vines 16 can be understood with reference to FIGS. 2, 3, and 5. Motor 60, which typically comprises a hydraulic motor of between about 1.0 and 10.0 horsepower, rotates beater bars 32 through drive system 50, as described above. The hydraulic power from motor 60 will typically be provided by a tractor, while electric motors, gas motors, and the like, are also within the scope of the present invention. Harvester 10 is maneuvered between rows of trellis system 18 to bring beater bars 32 into engagement with vines 16 of one row.

In some embodiments, one or both ends of frame 34 may be raised or lowered so that beater bars 32 extend substantially throughout the height range of raisins 14 on vines 16. As can be understood with reference to FIG. 5, each beater bar 32 orbits around an orbital path 64 which is much smaller than the overall size of harvester head 12. As beater bars 32 will typically be offset laterally from axes 36 of shafts 52 by between about 0.5 inches and 2.0 inches, and as rods 32 can flex radially outwardly depending upon the speed of rotation, each orbital path 64 will typically have a diameter between about 1.0 inch and 6.0 inches. Such relatively small oscillations help to minimize the damage to vines 16.

Shafts 52 are generally aligned in parallel along frame 34, so that axes 36 of the shafts substantially define a plane 68. As harvester 10 moves forward along trellis system 18, beater bars 18 comb through vine 16, detaching raisins 14 from the adjacent vines. The harvesting action is substantially centered around plane 68, so that moving the harvester forward translates the effective harvesting region evenly through the vine. Additionally, the use of beater bars which are substantially parallel to their orbital axes helps promote a substantially even harvesting action, with the ends 62 of beater bars 32 striking the adjacent vines and raisins with substantially the same force and speed as portions of the beater bars which are closer to frame 34.

As can be understood with reference to FIGS. 2 and 5, beater bars 32 comb through vines 16, with each beater bar directly engaging only a limited portion of the vines within height range R. Height ranges R of adjacent beater bars generally overlap, helping to ensure that the entire vine is harvested. Advantageously, movement of harvester 10 forward causes beater bars 32 to move laterally through vine 16, but does not tend to draw the vines 16 from trellis system 18 over towards conveyer system 26 of the harvester. This helps minimize the amount of cane material which is detached from the trellis system with the harvested raisins 14. Additionally, the direction of orbital travel of the beater bars will tend to direct raisins 14 from vines 16 upward, downward, or fore and aft along the length of sloped tray 20, rather than sideways away from the harvester. This may help increase the efficiency of the harvesting process.

As can be understood with reference to FIGS. 1 and 5, the flexibility of beater bars 32 allows these structures to flex around the major structures of vines 16, and also around the support posts and wires of trellis system 18. This helps prevent damage to the beater bars, the trellis system, and to the production capabilities of the vines.

As described above, the operator may adjust the height of one or both ends of frame 34 to vary the overall harvesting height range of harvester head 12. Additionally, the operator may vary the rotational speed of beater bars 32 (using a motor speed controller coupled to drive motor 60) to vary the intensity of the harvesting action. Changes in the angle α of frame 34 also vary the amount of overlap between adjacent orbital height ranges R, thereby varying the duration of the engagement between harvester head 12 and each section of vines 16. Still further variations and controls are possible, such as by varying the forward speed of harvester 10 (which varies the time of engagement of harvester head and a region of vine 16), by varying the distance which beater bars 32 extend into vines 16 towards trellis system 18, and the like.

While the above description is primarily directed to the use of harvester head 12 for harvesting dried-on-the-vine raisins, this in no way limits the scope of the present invention. In fact, harvester head 12 may be used with a variety crops, including alternative vine crops, tree crops such as olives, and the like. Optionally, orbiting beater bars 32 could be arranged in multiple rows, might be staggered or aligned in a matrix, or might be supported on a scissor-jack-type structure to move up and down for harvesting more vertically arranged crops such as olives. Hence, while the exemplary embodiment has been described in some detail, by way of example and for clarity of understanding, the scope of the present invention is limited solely by the appended claims.

What is claimed is:

1. A device for harvesting a crop from a crop plant, the device comprising:

a frame;

a plurality of shafts rotatably mounted to the frame, each shaft being rotatable about an associated axis;

a drive system coupled to the shafts; and a plurality of crop beater rods extending in cantilever from the shafts to free distal ends of the rods, each rod defining an axis, the axes of the rods being laterally offset from the axes of the shafts so that the rods orbit about the axes of the shafts to detach the crop from the crop plant when the shafts are rotated by the drive system, wherein the orbit of each free distal end defines an orbital path diameter about the shaft axis, and wherein the rods flex laterally so that the orbital path diameters increase when rotational speeds of the shafts increase.

2. A harvesting device as claimed in claim 1, wherein the axes of the shafts are distributed along the frame.

3. A harvesting device as claimed in claim 2, wherein the axes of the shafts are aligned in parallel and laterally separated.

4. A harvesting device as claimed in claim 3, wherein the crop is distributed vertically along the crop plant, wherein each rod extends horizontally and orbits across an orbiting height range, and wherein the axes of the shafts are distributed at differing heights along the frame so that the orbiting rods can engage the plant and detach the crop from the crop plant along a plurality of orbiting height ranges.

5. The device as claimed in claim 1, wherein the crop beater rods are resiliently flexible and substantially straight.

6. A harvester head as claimed in claim 1, wherein the frame is adapted for attachment to a harvester for use along rows of the crop plants.

7. A harvesting device as claimed in claim 6, wherein the crop plants comprise vines, wherein the orbiting rods extend horizontally from the frame to extend into the vines and detach a vine crop from the vines.

8. A harvesting device as claimed in claim 7, further comprising:

a separation system having a plurality of paddles, wherein the separation system defines a path along the paddles; and a crop gathering system disposed below the paddles to gather the vine crop which falls from the path.

9. A harvesting device as claimed in claim 8, wherein the separation system is disposed between the orbiting rods and the crop gathering system, the separation system for separating extraneous vine materials from the vine crop.

10. A device as claimed in claim 1, wherein the rods extending from adjacent shafts are mounted at an offset angle.

11. A device as claimed in claim 10, wherein the offset angle is approximately 90°.

12. The device as claimed in claim 5, wherein the crop beater rods comprise fiberglass.

13. The device as claimed in claim 1, wherein the axes of the shafts are substantially parallel with the axes of the crop beater rods.

14. A device for harvesting a crop from a crop plant, the device comprising:

a frame;

a plurality of shafts rotatable mounted to the frame, each shaft being rotatable about an associated axis;

a drive system coupled to the shafts; and a plurality of crop beater rods affixed to the shafts so as to extend in cantilever from the shafts to free distal ends of the rods, each rod defining an axis, the axes of the rods being offset from the axes of the shafts so that the rods orbit about the shafts when the shafts are rotated by the drive system, wherein each rod is sufficiently flexible to deflect laterally and allow the frame to move past an obstruction in a path of the orbiting rods when the frame moves so that the rods comb laterally through the crop plant relative to the axes of the shafts.

15. A method for harvesting a crop from a crop plant, the method comprising:

rotating a plurality of shafts, wherein each shaft supports a rod in cantilever with the rod laterally offset from the shaft so that free distal ends of the rods orbit about axes of the shafts;

moving the shafts along so that the free distal ends of the rods extend into a crop plant; and detaching a crop from the crop plant with the free distal ends of the orbiting rods.

16. A harvesting method as claimed in claim 15, further comprising moving the orbiting rods laterally relative to the shafts so that the orbiting rod ends comb laterally through the crop plant.

17. A harvesting method as claimed in claim 16, further comprising deflecting the rods laterally against at least one of a crop plant or a crop support structure.

18. A harvesting method as claimed in claim 17, further comprising maintaining parallel alignment between the rotating shafts so as to define a harvesting plane, wherein the moving step comprises translating the orbiting shafts at an angle relative to the harvesting plane.

19. A method as claimed in claim 15, further comprising changing a rotation rate of the shafts to adjust an orbital path of the rods.

20. A method as claimed in claim 19, further comprising increasing the rotation rate of the shafts to increase an orbital diameter of the free distal end.

* * * * *